Nov. 9, 1943.　　　　J. LUCAS　　　　2,333,727
NOZZLE
Filed Sept. 18, 1942

INVENTOR
Jack Lucas
BY
　　Corbeter + Corbeter
　　　　ATTYS

Patented Nov. 9, 1943

2,333,727

UNITED STATES PATENT OFFICE 2,333,727
NOZZLE

Jack Lucas, Stockton, Calif.

Application September 18, 1942, Serial No. 458,893

2 Claims. (Cl. 47—49)

This invention relates to nozzles, the main object being to provide a nozzle of unique design, particularly adapted for attachment to a rigid water-feeding handle and usable for sub-irrigation purposes in gardens and the like; such nozzle comprising, in rigid relation, an elongated tubular neck having a prong projecting forwardly therefrom, the forward end of the neck being partially closed in a direction toward the prong whereby to provide a restricted water discharge opening, and opposed openings in the sides of the neck immediately inwardly of said restricted opening whereby to create a turbulence or agitation within the adjacent portion of the nozzle and so as to prevent said restricted opening from plugging with earth.

A further object of the invention is to produce a simple and inexpensive device and yet one which will be exceedingly effective for the purpose for which it is designed.

These objects 1 accomplish by means of such structure and relative arrangement of parts as will fully appear by a perusal of the following specification and claims.

In the drawing similar characters of reference indicate corresponding parts in the several views.

Figure 1:
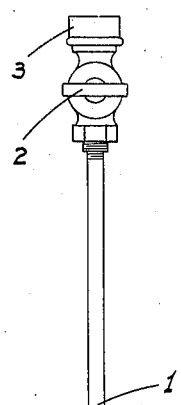
Figure 1 is an elevation of my improved garden implement in use.
Figure 2:
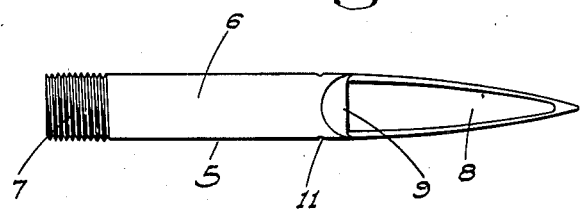
Figure 2 is a front elevation of the nozzle detached.
Figure 3:
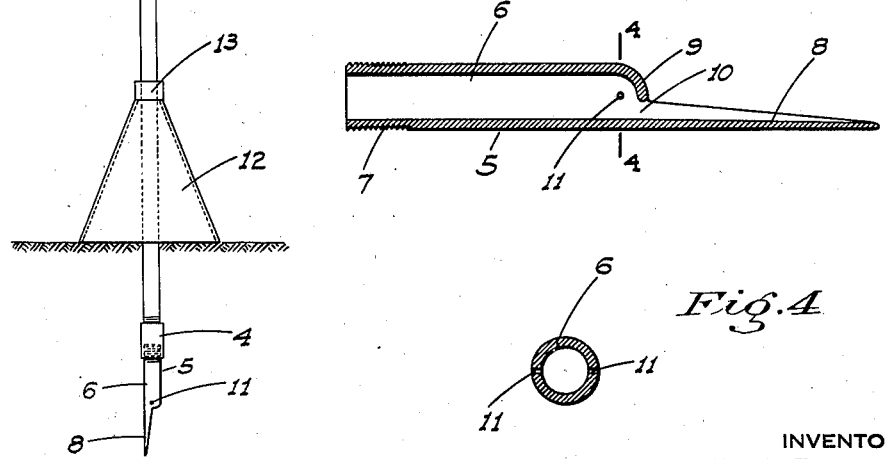
Figure 3 is a longitudinal sectional elevation of the nozzle detached.
Figure 4:
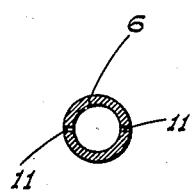
Figure 4 is a cross section on line 4—4 of Fig. 3.

Referring now more particularly to the characters of reference on the drawing, the implement to which my improved nozzle may be attached comprises a relatively long pipe 1 fitted at its upper end with a valve 2 which is adapted for connection as at 3 with the outlet fitting of a garden hose.

At its lower end the pipe 1 is connected by a short nipple 4 to a ground penetrating and irrigating nozzle indicated generally at 5.

The nozzle 5 may be constructed from a short length of pipe and comprises, in integral relation, the following:

An elongated tubular neck 6 is threaded at its inner end 7 for connection with nipple 4, and an integral prong 8 projects forwardly from the neck 6 at the back; said prong being arcuate in cross section and tapering in its longitudinal and transverse plane to a point at its outer end. The inner end of the prong 8 is of an arcuate extent slightly less than one-half of the adjacent or forward end of the neck 6.

A lip 9 is turned inward at the forward end of neck 6 and from the front thereof; said lip being turned in a direction toward the prong 8 and approximately one-half way across the neck opening, whereby to form a restricted water discharge opening 10 between said lip and the prong so that water passing through said restricted opening 10 will forcefully discharge down said prong.

Immediately inwardly of lip 9 small diameter, water outlet openings 11 are formed through opposite sides of the neck 6.

In use, the device is connected with a garden hose and is then penetrated into the ground as far as possible by hand. Thereafter, and with continued pressure on pipe 1, the force of the water discharging from restricted opening 10 in nozzle 5 hydraulically burrows the nozzle into the ground to any desired depth, effecting both a cultivation and sub-surface irrigation thereof. The opposed small-diameter side openings 11 cause a certain amount of turbulence or agitation within the nozzle immediately rearwardly of lip 9 and this action sets up a cross current of the water and assures against plugging of the restricted opening 10 by earth as the nozzle is pressed down.

The above described garden implement will be found quite useful in cultivating and irrigating about trees, shrubs and vines of all types, and assures that proper cultivation and irrigation is obtained about the roots thereof; the distance which the nozzle 5 will penetrate the ground being limited only by the length of pipe 1.

As is shown in Fig. 1, an anti-splash hood 12, of inverted funnel shape, may surround the pipe 1 and is slidably mounted in connection with the latter by means of a slide collar 13. When the implement is in use and the nozzle 5 penetrates into the ground, the hood 12 seats on the ground, preventing splashing of the water on the operator. Also, when the nozzle is drawn clear of the ground, the hood slides down over the nozzle, confining the lateral jets from openings 11.

While the prong 8 is shown and described as tapering to a point, it may be constructed without this taper, and so that the prong 8 will be generally in the form of a gouge.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A nozzle comprising, in integral relation, a tubular neck, a prong projecting forwardly from the neck at the edge thereof and a lip turned inward from the front of the neck at its forward end partially closing said end of the neck and forming a restricted water discharge opening, said opening discharging down the prong, there being small-diameter water outlet openings formed in opposite sides of the neck immediately rearwardly of said lip.

2. A nozzle comprising, in integral relation, an elongated tubular neck, a prong projecting forwardly from the neck, and a lip turned inward from the neck at its forward end partially closing the latter and forming a restricted water discharge opening; there being relatively small diameter water discharge openings formed in opposite sides of the neck immediately rearwardly of said lip.

JACK LUCAS.